(12) United States Patent
Nazarov et al.

(10) Patent No.: US 6,962,734 B2
(45) Date of Patent: Nov. 8, 2005

(54) SULFODERIVATIVES OF INDANTHRONE, LYOTROPIC LIQUID CRYSTAL SYSTEM AND ANISOTROPIC FILM ON THEIR BASE

(75) Inventors: Victor V. Nazarov, Moscow (RU); Elena N. Sidorenko, Moscow (RU)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/046,338

(22) Filed: Jan. 27, 2005

(65) Prior Publication Data

US 2005/0129878 A1 Jun. 16, 2005

Related U.S. Application Data

(63) Continuation of application No. 10/455,282, filed on Jun. 4, 2003, now abandoned.

(30) Foreign Application Priority Data

Jun. 7, 2002 (RU) .............................. 2002114926

(51) Int. Cl.[7] .................. C09K 19/00; G02F 1/1335; C07D 241/36; G02B 5/30
(52) U.S. Cl. ................. 428/1.31; 428/1.1; 252/299.01; 252/299.1; 252/299.62; 349/117; 349/118; 349/194; 544/339; 359/485; 359/490
(58) Field of Search .............................. 428/1.1, 1.31; 252/299.01, 299.1, 299.62; 349/117, 118, 349/194; 544/339; 359/485, 490

(56) References Cited

U.S. PATENT DOCUMENTS

| | | | |
|---|---|---|---|
| 2,553,961 A | 5/1951 | Dreyer | |
| 4,692,189 A | 9/1987 | Bäbler et al. | |
| 6,583,284 B1 * | 6/2003 | Sidorenko et al. | .......... 544/342 |

FOREIGN PATENT DOCUMENTS

| | | |
|---|---|---|
| DE | 216891 | 12/1909 |
| DE | 565247 | 11/1932 |
| EP | 0604895 A1 | 7/1994 |
| EP | 0643114 A2 | 3/1995 |
| EP | 0961138 A1 | 12/1999 |
| EP | 1128192 A1 | 8/2001 |
| RU | 1753700 | 4/1994 |
| WO | WO 94/28073 | 12/1994 |
| WO | WO 99/31535 | 6/1999 |
| WO | WO 02/48269 A1 | 6/2002 |

OTHER PUBLICATIONS

V.A. Bykov, A.S. Vasilevskaya, Z.V. Generalova, L. Ya Ignatov, E.L. Kitaeva, A.S. Sonin, Shan Ir Gvon, E. Yu Shishkina, "Lyotropic Mesophases in the Disulphoindanthrone-Water System", Organic Intermediates and Dyes Research Institute, Moscow, Russian Journal of Physical Chemistry 63 (3) 1989, pp 433-436 with English Translation.

N.M. Kormilitsyn, N.V. Usol'tseva, V.V. Bykova, and G.A. Ananieva, "Supramolecular Organization in the Disulfoindanthrone-Water System", Colloid Journal, vol. 61, No. 1, 1999, pp. 67-71 with English Translation.

(Continued)

Primary Examiner—Shean C. Wu
(74) Attorney, Agent, or Firm—Dorsey & Whitney LLP

(57) ABSTRACT

The present invention relates to organic chemistry, in particular, to synthesis of sulfoderivatives of the polycyclic compounds and fabrication of optically anisotropic coatings on their base.

The indanthrone sulfoderivatives of the general structural formulas I or II capable of forming LLC phase are disclosed. The disclosed compounds could be used, in particular, for producing optically isotropic or anisotropic and at least partially crystalline films. The application also includes the liquid crystal systems based on the disclosed compounds, and anisotropic films.

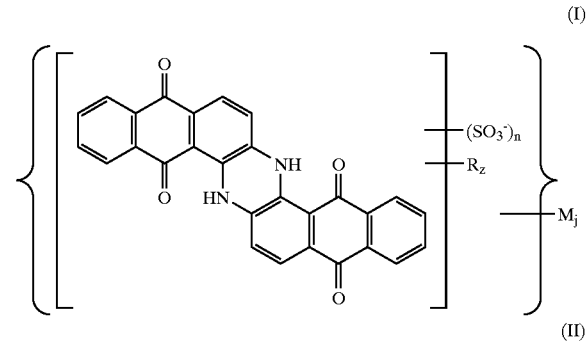

(I)

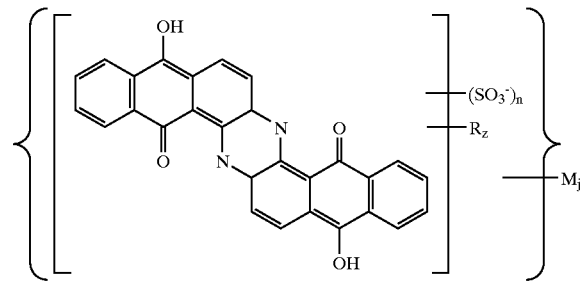

(II)

wherein n is 3 or 4,
R=$CH_3$, $C_2H_5$, $OCH_3$, $OC_2H_5$, Cl, Br, OH, $NH_2$,
z is the value selected from the list including 0, 1, 2, 3, and 4,
M—counterion, and
j—number of counterions in a dye molecule, and which can be fractional in case of one counterion belonging to several molecules, and in case n>1, counterions may be different.

34 Claims, No Drawings

OTHER PUBLICATIONS

Mark S. Cubberley and Brent L. Iverson, "$^1$H NMR Investigation of Solvent Effects in Aromatic Stacking Interactions", J. Am Chem. Soc. 2001, 123, pp. 7560-7563.

Birendra Bahadur, "Liquid Crystals Applications and Uses", vol. 1, World Scientific, pp. 100-103.

D. Demus, J. Goodby, G.W. Gray, H.W. Spiess, V. Vill, "Handbook of Liquid Crystals", vol. 2B Low Molecular Weight Liquid Cyrstals II, 3 pages, 1998.

John Lydon, "Chapter XVIII Chromonics", pp. 982-1007. Handbook of Liquid crystals, vol. 26, 1998.

* cited by examiner

SULFODERIVATIVES OF INDANTHRONE, LYOTROPIC LIQUID CRYSTAL SYSTEM AND ANISOTROPIC FILM ON THEIR BASE

CROSS-REFERENCES TO RELATED APPLICATIONS

This application is a continuation patent application of U.S. patent application Ser. No. 10/455,282 filed on Jun. 4, 2003 now abandoned, which claims priority to Russian Patent Application Serial No. 2002114926, filed on Jun. 7, 2002, the disclosure of which is hereby incorporated by reference in its entirety.

FIELD OF THE INVENTION

The present invention relates to organic chemistry, in particular, to synthesis of polycyclic sulfoderivative compounds and manufacturing methods for producing optically anisotropic coatings based on these compounds.

BACKGROUND OF THE INVENTION

Progress in modem technologies is based on creating new materials and developing optical elements with desired properties based thereupon. In particular, a necessary element in the design of modem displays is an optically anisotropic film possessing the optimum combination of characteristics for a given application.

A number of polymeric materials may be employed in the manufacture of optically anisotropic films. The anisotropic optical properties of these films result from uniaxial extension and modification with organic or inorganic (iodine) compounds. Poly-vinyl alcohol, (PVA) is commonly used as the base polymer as described in Liquid Crystals: Applications and Use, B. Bahadur (ed.), World Scientific, Singapore (1990), Vol. 1, p. 101–103. However, the low thermal stability of PVA-based films limits their applicability. New methods for the synthesis of optically anisotropic films possessing improved characteristics are needed for these reasons.

Organic dichroic dyes may be used for the synthesis of optically anisotropic films that exhibit excellent optical and workability characteristics. Films based on such compounds are obtained through application of a liquid-crystalline aqueous dye solution onto a substrate surface, followed by evaporation of the solvent, such as for instance water. Anisotropic properties may be imparted to the films either through preliminary mechanical orientation of the substrate surface, such as is described in U.S. Pat. No. 2,553,961, or by means of an external orienting action, such as for example mechanical, electromagnetic, or the like, exerted on the film material while it is in a liquid crystal state. This approach is explained in greater detail in PCT patent publication WO 94/28073.

Although the liquid-crystalline properties of dye solutions have been known for some time, extensive investigations of these systems have begun only recently. The new research efforts have been stimulated by the capability of some of these dyes of forming "chromonic" liquid crystal systems. A distinctive feature of chromonic systems is that dye molecules are packed into supramolecular complexes having the form of columns, which are the structural elements of a mesophase. The highly ordered structure of dye molecules in these columns allows use of these mesophases for forming strongly dichroic oriented films.

Molecular structures, phase diagrams, and the mechanisms of molecular aggregation in various chromonic systems, including organic dyes, have been previously reviewed (i.e. Lydon, J. Chromonics, in: Handbook of Liquid Crystals (Wiley-VCH, Weinheim, 1998), Vol. 2B, pp. 981–1007). A special feature of dye molecules that form chromonic mesophases is the presence of peripheral groups that render these dyes water-soluble. The main structural unit of all chromonic mesophases is a column of stacked molecules. The chromonic mesophases of organic dyes are soluble, possess a special structure, and are characterized by specific phase diagrams and optical properties.

By using dichroic dyes capable of forming lyotropic liquid crystal (LLC) systems, it is possible to obtain films possessing a high degree of optical anisotropy. Use of high-strength dyes for the film formation, produces films characterized by high thermo- and photo-stability.

These properties have produced substantial interest in LLC systems for use in optical films. Development of new methods for creating the dye-based films through the optimization of deposition procedure have been investigated, as have new compositions of lyotropic liquid crystals (LLC). New LLC compositions may be developed through introduction of modifying additives, stabilizing additives, surfactants and other additives to the known dyes, thus improving film characteristics as described in RU 2047643 and WO 99/31535.

Anisotropic films that are selective in different wavelength ranges are required by a growing number of new products. It is therefore desirable to develop new varieties of compounds capable of forming an LLC phase and films with the required properties. Films with different absorbance maxima location in a wide spectral range from the infrared to the ultraviolet are also desirable. However, only a small number of currently available dyes are useful in the formation of lyotropic mesophases. Thus, each new LC dye is now an object of close attention.

Indanthrone disulfoderivatives are dichroic dyes capable of forming a stable lyotropic LC phase that are also useful for preparation of optical anisotropic films. Lyotropic mesophases in disulfoindanthrone—water systems have been investigated by V. A. Bykov etc. "Lyotropic mesophases in the system disulfoindanthrone—water," Zhurnal Phyzicheskoi Khimii. Vol. LXIII, No. 3, "Nauka", 1989, pp. 793–796. Indanthrone is a vat dye that is practically insoluble in water that may be converted to a water-soluble form through a sulfonation process. To produce the disulfoderivative, an effective amount of indanthrone and oleum is added to chlorosulfonic acid under prescribed conditions. When the reaction completed, the mixture is cooled and diluted with water. The resultant precipitate is filtered, washed with hydrochloric acid, and dried. The produced disulfoindanthrone is then dissolved in water and purified. Based on analysis of the disulfoindanthrone—water system properties, it appears that a stable lyotropic hexagonal mesophase is formed starting from a certain dye concentration in a certain temperature range. The isotropic phase, the two-phase transition regions and the nematic phase are observed in rather narrow temperature and concentration ranges. The existence ranges for chromonic-type nematic and hexagonal phases in a disulfoindanthrone—water system have been previously investigated and reported in N. M. Kormilitsin, N. V. Usol'tseva, V. V. Bykova, G. A. Anan'eva, "Supramolecular Organization in the Disulfoindanthrone-Water System" (1999). Kolloid. J., 61, 75 (in Russian). On the basis of X-ray diffraction analysis data and stereochemical relations, a model of disulfoindanthrone supramolecular aggregates packing has been suggested.

Various dyes based on indanthrone disulfoderivatives for use in polarizer film fabrication have been previously described. Among them is the dye 3-chloroindanthrone-4,4-disulfoacid of the structure:

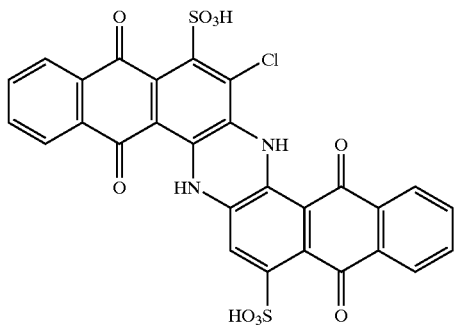

(A)

which is selective in the wavelength range of approximately 620–680 nm as described in RU 1753700. Mixtures of LC disulfoindanthrone have been described in RU 2047643 (EP 961138), as have different modifying additives for improving characteristics of anisotropic films based on these compounds. Various disulfoindanthrone derivatives with different substituents have been disclosed in PCT publication WO 94/28073, as have disulfoindanthrone derivatives with different organic cations in a structural formula in PCT publication WO 99/31535.

One of the main disadvantages of previously described water-soluble indanthrone disulfoderivatives is the complexity of producing anisotropic films with uniform properties over the substrate surface based on these compounds. The complexity results from the high viscosity of LC solutions, their phase instability, and the likelihood of disorientation zones and micro-defects being formed by insufficiently uniform micro- and macro-crystallization proceeding during solvent removal after the liquid crystal is coated on a substrate surface. The high viscosity of the solutions based on currently available dyes also increases the probability of films of differing thickness being produced. This further decreases the reproducibility of the resultant film parameters. The viscosity of an LC system may be lowered by decreasing the dye concentration in the solution, but this may inhibit production of films with desired optical transmittance. These drawbacks complicate the process of forming films with high optical characteristics. Poor reproducibility necessitates accurate adjusting and strict control of fixed technological conditions at each film forming stage from coating to drying which may dramatically increase film production expenses.

SUMMARY OF THE INVENTION

It is an object of the present invention to broaden the functional possibilities of application of the optically anisotropic films while simplifying the method of manufacturing, as well as providing reproducible optical parameters over the entire area and volume of the film and achieving high levels of optical anisotropy.

In one embodiment of the present invention, an indanthrone sulfoderivative is provided. This indanthrone sulfoderivative is characterized by a structural formula selected from the group consisting of structures I and II:

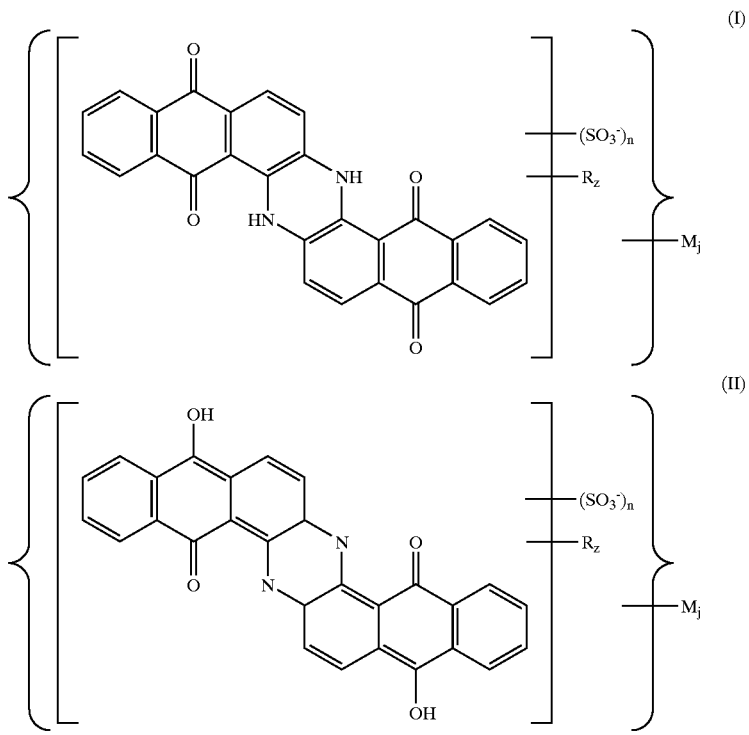

where n is an integer equal to 3 or 4; R is individually selected from the group consisting of $CH_3$, $C_2H_5$, $OCH_3$, $OC_2H_5$, Cl, Br, OH, $NH_2$; z is an integer in the range of 0 to 4; M is a counterion; and j is the number of counterions in a dye molecule.

In another embodiment of the present invention, a lyotropic liquid crystal system is provided. This lyotropic liquid crystal system comprises at least one indanthrone sulfoderivative of structures I and/or II.

In another embodiment of the present invention, an optically anisotropic film is provided. This optically anisotropic film comprises at least one indanthrone sulfoderivative of structures I and/or II.

In another embodiment of the present invention, a lyotropic liquid crystal system is provided. This lyotropic liquid crystal further comprises at least one indanthrone sulfoderivative of structural formula (III):

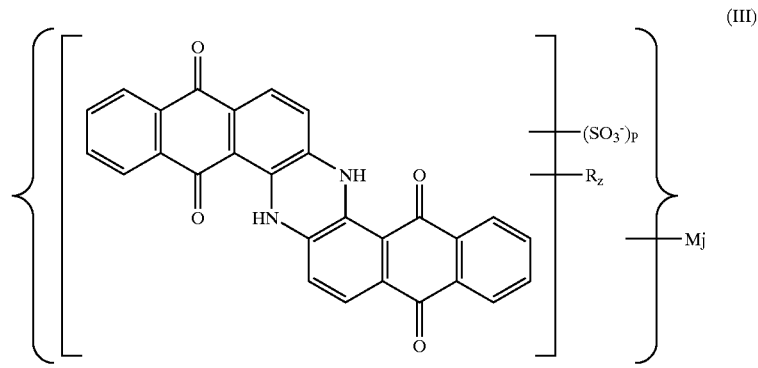

where p is an integer equal to 1 or 2; R is individually selected from the group consisting of $CH_3$, $C_2H_5$, $OCH_3$, $OC_2H_5$, Cl, Br, OH, $NH_2$; z is an integer in the range of 0 to 4; M is a counterion; and j is the number of counterions in a dye molecule.

In a further embodiment of the present invention, a method of making an optically anisotropic film is provided. The method includes the steps of depositing a lyotropic liquid crystal system as described above onto a substrate, applying an orienting force, and drying the film.

DETAILED DESCRIPTION OF THE INVENTION

The present invention provides methods for producing new chemical water-soluble compounds of the indanthrone series as well as methods for manufacturing optical elements based on these compounds. One advantage of the present invention is an expansion of the assortment of dyes—indanthrone disulfoderivatives—that are capable of forming LLC phases with enhanced phase stability and that may be used for production of isotropic or anisotropic films which are at least partially crystalline and have high optical characteristics. The compounds of the present invention provide solutions to may of the disadvantages of presently available compounds as discussed above.

One aspect of the present invention is development of new organic compounds and lyotropic liquid crystals based on these. These LLC systems possess optimal viscosity characteristics for optical film production as well as enhanced stability over wide temperature and pH ranges compared to currently available compounds. These properties desirably simplify the film formation process and facilitate the use of standard equipment for coating. Films based on these compounds may then readily be produced with reproducible parameters.

Another aspect of the present invention is development of new organic compounds possessing a more optimized hydrophilic-hydrophobic balance. This property affects the size and shape of the supramolecular complexes formed form these compounds. The molecular ordering rate in the complex itself is also improved, thereby permitting attainment of the required solubility of the considered compounds as well as high stability of LLC phases based on these compounds. Reproducibility of the formed film parameters is enhanced and the film formation process is streamlined due to elimination of tight process control requirements at the various stages of the film production process. A wider variety of compounds available for film production also eases production of films with specifically desired parameters. Film optical performance is further improved through increased uniformity of alignment of the dichroic dye molecule planes on a substrate. The dipole moments of electronic transitions also lie in these planes with respect to the direction determined by an external orienting stress.

Water-soluble indanthrone sulfoderivatives according to the present invention—may be represented by at least one of the general structural formulas I and II:

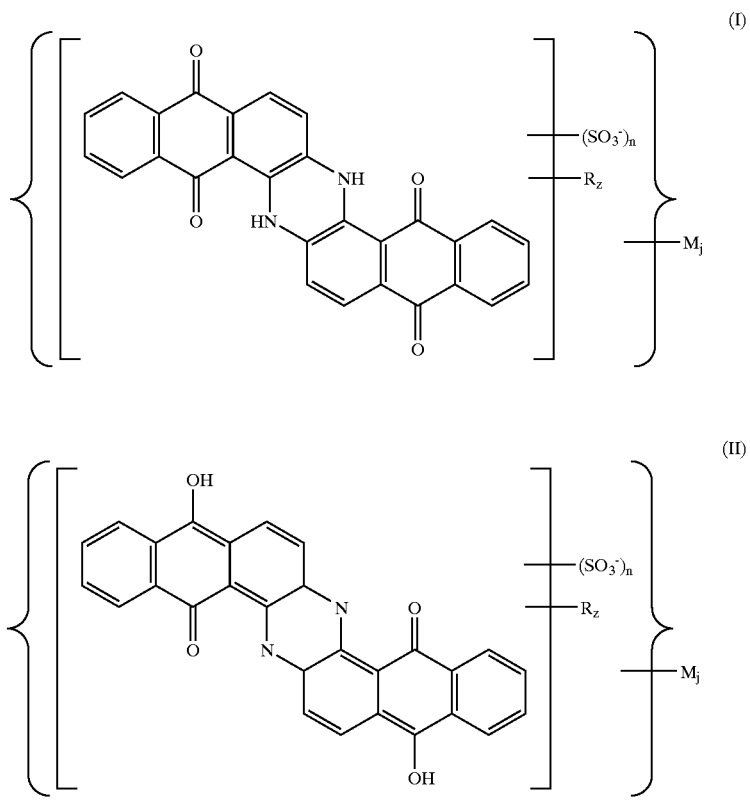

wherein n is an integer equal to 3 or 4; R is individually selected from the group consisting of $CH_3$, $C_2H_5$, $OCH_3$, $OC_2H_5$, Cl, Br, OH, $NH_2$; z is an integer in the range of 0 to 4; M is a counterion; and j is the number of counterions in a dye molecule. In the case of one counterion belonging to several molecules, j may be a fraction. If n is greater than 1, the counterions may be different.

Indanthrone trisulfo- and tetrasulfoderivatives and their derivatives of structures I and II may form anisotropic films, in individual form, as well as in blends with mono- and disulfoderivatives. Various cations, including for example those selected from the group of $H^+$, $NH^+_4$, $K^+$, $Li^+$, $Na^+$, $Cs^+$, $Ca^{2+}$, $Sr^{2+}$, $Mg^{2+}$, $Ba^{2+}$, $Co^{2+}$, $Mn^{2+}$, $Zn^{+/2+}$, $Cu^{2+}$, $Pb^{2+}$, $Fe^{2+}$, $Ni^{2+}$, $Al^{3+}$, $Ce^{3+}$, $La^{3+}$ and others as well as mixtures of cations may be used as counterions in compounds corresponding to structures I and II.

The strong propensity of indanthrone tri- and tetrasulfoderivatives to form LC structures is influenced by the presence of tautometric forms of indanthrone in the solutions of these sulfoderivatives. The hydroquinone moiety of structure II is capable of forming donor-acceptor complexes with the quinoid structures of the indanthrone of structure I. A donor-acceptor complex is formed by indanthrone containing the donor dihydroazine fragment and oxidized indanthrone (azine) containing the acceptor azine fragment, and such a complex is called a azhydrin as described in Ber., 36,3429.

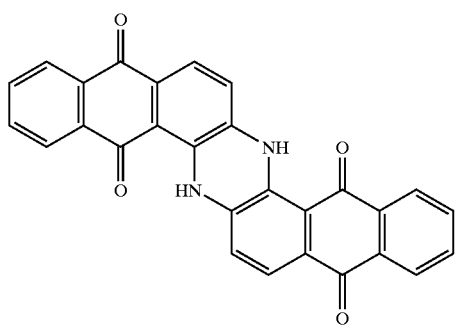

Indanthrone

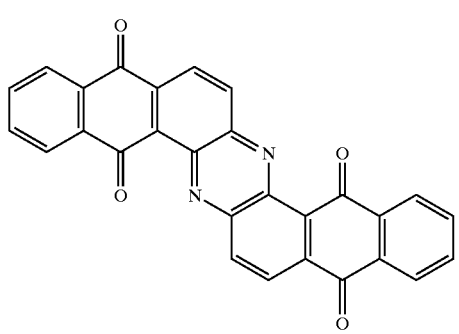

Azine

The hydroquinone form of indanthrone (structure II) tri- and tetrasulfoderivatives acts as an electron acceptor. Donor-acceptor interactions are enabled in tri- and tetrasulfoderivatives solutions between two types of molecules I and II. Previous studies of association processes in solutions, for instance as reported in Mark S. Cubberley, Brent L. Iverson, "1H NMR Investigation of solvent Effects in Aromatic Stacking Interaction," *J. Am. Chem. Soc.* 2001, p. 7560–7563, showed that the strength of molecular interactions in solutions is considerably dependent on their donor-acceptor properties. The strongest interactions are observed in donor-acceptor solutions. Acceptor-acceptor solutions have weaker interactions, and, donor-donor interactions are generally the weakest. Thus, the structure and properties of LC systems can be adjusted by varying the ratio of donor and acceptor molecules in solution. The presence of tautomers capable of forming donor-acceptor complexes in a solution of indanthrone sulfoderivatives increases the ordering of the resultant aggregates because mutual orientation of molecules in this case is much more perfect due to additional support provided by intermolecular hydrogen bond formation. This phenomenon is generally described in P. Carrer, Kurs organicheskoi chimii (*Organic chemistry*), Leningrad, 1960, p. 706, and illustrated in structure D.

LLC phases based on dyes according to the present invention are characterized by optimum viscosity for coating LC structures on substrates and also by enhanced stability in a wide concentration, temperature, pH range, this enabling to ease substantially film formation process, use standard equipment for coating, producing therewith films with reproducible parameters. In general, compounds corresponding to series I and II or their mixtures may form LC systems in which a desired hydrophilic-hydrophobic balance is realized. The presence of three or four sulfogroups at the periphery of a molecule for any type of molecules packing in a stack typically promotes the uniform distribution of charged groups over a stack surface. This reduces hydrophobic interactions between the stack structures in a solution. In turn, the sizes and shape of the formed supramolecular complexes are affected, as is the molecular ordering rate in a complex itself. This promotes high stability of LLC phases based on these compounds. As a result, reproducibility of the produced film parameters is improved and the film-forming procedure is simplified as optimization of process conditions and control at different stages of the film forming process is less important in production of high quality films. The optical characteristics of films are further improved by the increased uniformity of alignment of dich-

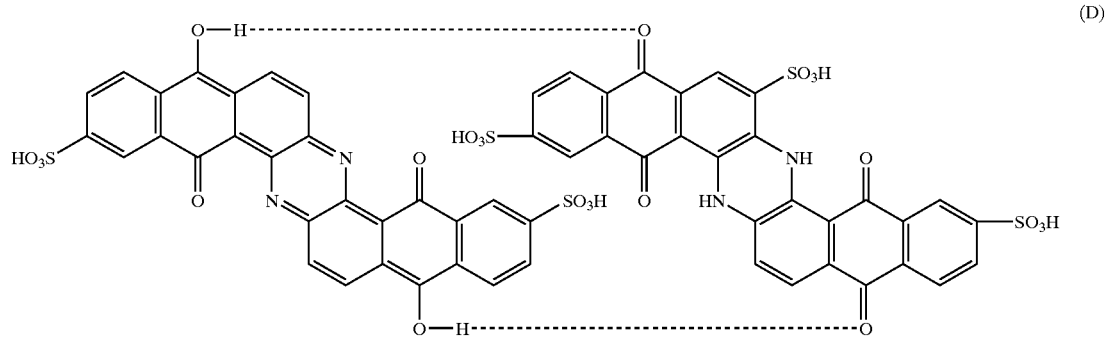

(D)

The existence of tautomeric forms in aqueous and aqueous-organic solutions is confirmed by isosbestic points present in the electron absorption spectra of indanthrone tri- and tetrasulfoderivatives.

The ratio of the quinoid I and hydroquinone II forms of indanthrone sullfoderivatives in a solution may be adjusted by varying pH and using different additives. Under particular conditions individual quinoid (alone) or individual hydroquinone forms of indanthrone can be yielded.

The disclosed synthesized organic dyes, both individually and in blends with each other and also with other dichroic dyes, as well as with indanthrone disulfoderivatives according to the present invention, are capable of forming stable LLC phases. The stable LLC phases may further form anisotropic at least partially crystalline films with high optical characteristics. Thus, using indanthrone polysulfoderivatives according to the present invention in individually, as well as in blends, including blends with monosulfoderivatives and disulfoderivatives, facilitates considerable improvement in the optical properties of anisotropic films.

In one embodiment of the present invention, a lyotropic liquid crystal system is provided wherein the LLC system comprises at least two compounds individually selected from structures I and II with at least two different substituents R and/or M and/or different n and/or z values.

roic dye molecule planes on a substrate. These planes contain dipole moments of electronic transitions with respect to the direction determined by an external orienting stress.

The films according to this embodiment of the present invention are anisotropic and at least partially crystalline. These films can be used as polarizers, in particular E-type polarizers; double refraction films; and similar applications. The properties of the films described herein are similar for any compounds with structures I or II, as well as for their blends and other compounds according to the present invention.

Sulfoderivatives of indanthrone with structure I and sulfoderivatives of the indanthrone tautomeric form corresponding to structure II can be produced by any of various methods. For example, indanthrone sulfoderivatives of general formulas I or II can be synthesized by sulfonation of indanthrone and its derivatives in particular temperature ranges with oleum of different concentration or with mixtures of oleum or monohydrate with chlorosulfonic acid. In another example, sulfoderivatives of structures I and II can be produced also through nucleophilic addition of the corresponding molecules to oxidized indanthrone and its derivatives. The individual indanthrone sulfoderivatives can also be produced by fractionating mixtures of sulfoderivatives, particularly, using fractional precipitation of dyes from solutions of their mixtures in sulfuric acid. Depending on the method chosen for production of tri- or tetrasulfoderivatives production, the quinone form I or hydroquinone form II can be extracted. Conditions favoring preferential formation of a structure I or II are generally created in solutions of sulfoderivatives according to the present invention.

Indanthrone sulfoderivatives of the present invention are capable of forming an LLC system, thereby facilitating their use ion the production of optically anisotropic films. Among other potentially advantageous uses, dyes according to the present invention are particularly useful in the formation of at least partially crystalline films. These dyes may be used to form polarizing films, among others.

In some embodiments of the present invention, a mixture of water and organic dye is used to obtain an LLC phase. The dye may be completely miscible with water or alternatively it may be only partially miscible with water. It is desirable that the content of indanthrone sulfoderivatives or their mixtures in LC systems according to the present invention is within the range of approximately 3% to 30% by mass, and more specifically in the range of approximately 5 to 15% by mass. Indanthrone sulfoderivatives according to the present invention may be used in a mixture of compounds characterized by at least one of structures I and II with at least two different values of R, n, M, or z. Indanthrone sulfoderivatives according to the present invention may further comprise a mixture of compounds characterized by at least two structural formulas from the series I and II. Indanthrone sulfoderivatives of the present invention may further comprise at least mono- and/or disulfoderivative of indanthrone as illustrated by structure III. Compounds of structure III may be synthesized by methods described in DBP216891, DBP565247, EP254681, DE604895, DE643114, and RU 1753700, among others.

Upon dissolution in water of indanthrone sulfoderivatives according to the present invention and more specifically those characterized by general structural formulas I or II, mixtures thereof, or mixtures with compounds characterized by general structural formula III, the indanthrone sulfoderivatives molecules form anisometric (rod-like) aggregates, in which molecules are packed in a structural configuration that resembles a stack playing of cards. Each such aggregate in aqueous solution represents a micelle having a double electric layer. The solution forms a highly-dispersed (colloid) lyophilic system. As the concentration of micelles in solution increases, natural ordering of the anisometric aggregates leads to nematic lyotropic mesophase formation, and the system becomes liquid crystalline. The concentration at which transfer to LC state occurs depends on indanthrone sulfoderivatives ratio and typically lies in a concentration range of approximately 3% to 50% by mass. The LC state is easily fixed with standard methods, for example, using polarization microscope.

In one embodiment of the present invention, the interplanar spacing in a crystal of the LC system is in the range of approximately 3.1 Å to 3.7 Å along one of the optical axes.

A LLC system in accordance with one embodiment of the present invention is a water-based LLC system containing indanthrone sulfoderivatives corresponding to any of the previously described embodiments. A LLC system according to the present invention may be based on a mixture of water with an organic dye that is miscible with water at any ratio or alternatively one that is restrictedly miscible with water.

In one embodiment of the present invention, the concentration of indanthrone sulfoderivatives or their mixtures in an LC system is in the range of approximately 3% to 40% by mass. Alternatively, the concentration may be in the range of 5% to 25% by mass. A LC system according to this

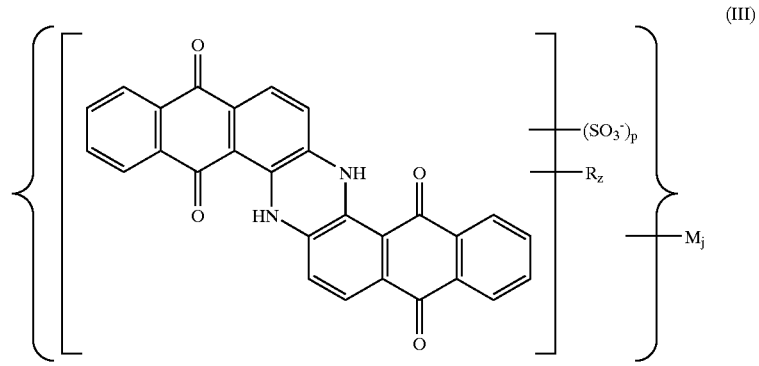

(III)

wherein p is an integer equal to 1 or 2, R is a ring substituent individually selected from the group consisting of $CH_3$, $C_2H_5$, $OCH_3$, $OC_2H_5$, Cl, Br, OH, $NH_2$, z is an integer in the range of 0 to 4, M is a counterion; and j is the number of counterions in a dye molecule.

In the case of one counterion belonging to several molecules, j may be a fraction. If n is greater than 1, the counterions may be different.

In yet another embodiment of the present invention, the above described mixturex of indanthrone sulfoderivatives may additionally contain at least one water-soluble organic dye. This organic dye modifies the properties of the produced film.

embodiment may further comprise up to approximately 2% by mass of surfactants and/or plasticizers. Alternatively, the concentration of surfactants and/or plasticizers is less than approximately 1%.

A LC system according to one embodiment of the present invention comprises a mixture of the following indanthrone sulfoderivatives with the following concentrations:

Tetrasulfoderivatives of structures I–II with a concentration in the range of approximately 0% to 30% by mass. Preferably, this concentration may be in the range of approximately 0% to 20% by mass.

Trisulfoderivatives of structures I–II—with a concentration in the range of approximately 0% to 70% by mass.

Preferably, this concentration may be in the range of approximately 10% to 60% by mass.

Disulfoderivatives of structure III—with a concentration in the range of approximately 0% to 70% by mass. Preferably, this concentration may be in the range of approximately 10% to 50% by mass.

Monosulfoderivatives of structure III—with a concentration in the range of approximately 0% to 30% by mass. Preferably, this concentration may be in the range of approximately 0% to 20% by mass.

LC solutions of individual indanthrone sulfoderivatives characterized by general structural formulas I or II, mixtures thereof, or mixtures of compounds according to the present invention with one or more compounds characterized by general formula III, may be deposited on a substrate surface and aligned. Methods for alignment of LC solutions on a substrate have been described in PCT publications WO 94/28073 and WO 00/25155, among others. Possible alignment methods include, for example, by application of shear stress or of a gravitational or electromagnetic field. To improve substrate surface wetting and rheological properties of the the LC solution, the solution may be doped with modifying additives, such as for example plasticizing water-soluble polymers and/or anion-active or nonionic surfactants. Low-molecular weight water-soluble compounds may be used alternatively or in addition to the previously described additives. These additives desirably do not destroy or otherwise substantially interfere with the alignment of an LC solution. Upon solvent removal from the oriented film, an anisotropic polycrystalline film with a thickness of approximately 0.2–1.2 microns is formed.

Films according to the present invention exhibit high optical anisotropy. For example, polarizing films formed from the dyes of the structure I and/or II typically have a contrast ratio that is 2 to 3 times higher than that of films based on disulfoindanthrone. The dichroic ratio at a wavelength corresponding to the main absorption band maximum is within the range of approximately 25 to 30. Furthermore, the resultant films are at least partially crystalline and possess high parameter reproducibility over the surface.

Analysis of absorption spectra of films based on dyes according to the present invention has shown that these films selectively absorb light in different regions of the visible spectrum. For illustration structures IV through VII, below have absorption maxima at 480 nm, 580 nm, 650, and 670 nm, respectively.

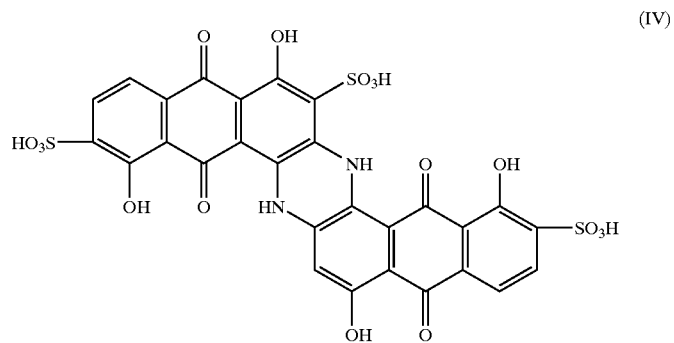

(IV)

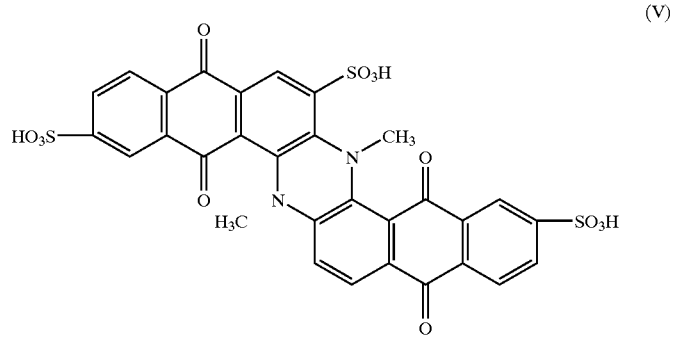

(V)

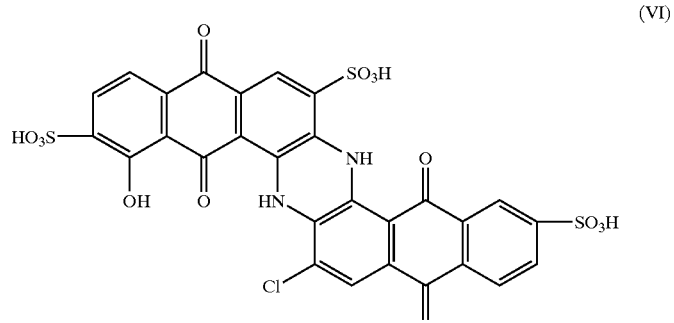

(VI)

-continued

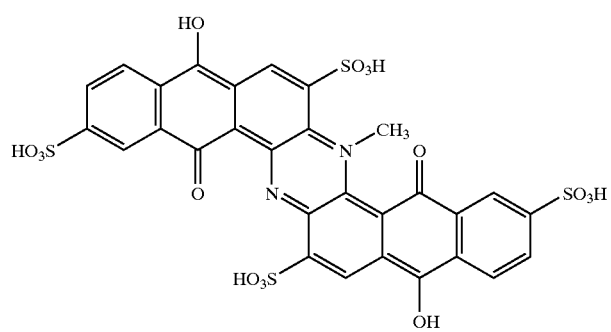

(VII)

Thus, indanthrone sulfoderivatives according to the present invention are capable of forming LLC systems that facilitate manufacturing of colored anisotropic films that are characterized by high optical parameters and selectivity in different spectrum regions.

EXPERIMENTAL

A number of experiments were conducted according to the method and system of the present invention. These experiments are intended for illustration purposes only, and are not intended to limit the scope of the present invention in any way.

Example 1

Trisulfoindanthrone was obtained by the sulfonation of indanthrone and the further precipitation of the indanthrone trisulfoacid as follows.

Step 1A: Sulfonation. 50 g of indanthrone was introduced to the mixture of 100 ml of 30% oleum and 30 ml of the chlorosulfonic acid. The mixture was heated to 100–110° C. The reaction mixture was maintained at this temperature for 15 hours. The process yielded a mixture of indanthrone tri- and tetrasulfoderivatives at a ratio 3:1.

Step 1B: Precipitation of indanthrone trisulfoacid. The reaction mixture was cooled, two-fold diluted, first with 92% sulfuric acid and then with water to the rated sulfuric acid concentration 80%. The formed precipitate was filtered, diluted with 2 liters of water, and then boiled for 6 hours. After neutralization with ammonia and ultrafiltration, the process yielded an aqueous solution of indanthrone trisulfoacid ammonium salt containing 48 g of the desired product. The ammonium salt solution was further used for LC systems preparation.

Indanthrone trisulfoacid was produced from the ammonium salt by ion exchange by passing 500 ml of 1% ammonium salt solution through 100 g of ion-exchange resin. The obtained solution was concentrated in vacuum and dried. The process yielded 4.7 g of indanthrone trisulfoacid of a structure:

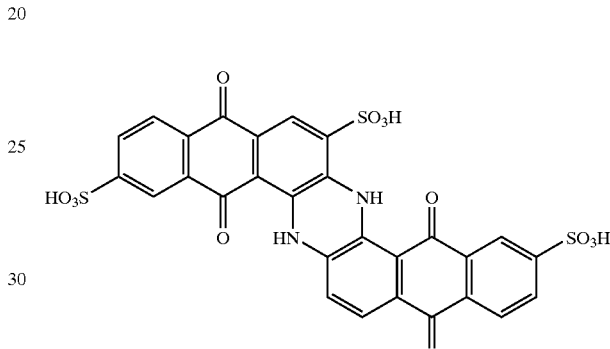

The electron spectrum (spectrometer Ocean PC 2000, aqueous solution) of the sample had $\lambda_{max}$=695 nm. Infrared spectrum (IR-Fourier spectrometer FSM-1201, film on the windows KRS-5) peaks were located at 1036, 1188.4 ($SO_3H$); 1643.7 cm$^{-1}$ (C=O). The mass-spectrum (VISION 2000) result was the following: molecular ion (negative polarity) of 680.2 (m/z), and calculated molecular weight value of 681.97. Elemental analysis measured (%) C 49.10; 49.06; H 1.99; 2.11; 3.87; 4.02; S 14.32; 14.54. $C_{28}H_{14}N_2O_{13}S_3$. Calculated values were (%): C 49.27; H 2.07; N 4.10; S 14.09.

Example 2

Tetrasulfoindanthrone was obtained by the sulfonation of indanthrone and the further precipitation of the indanthrone tetrasulfoacid.

Step 2A: Sulfonation. Indanthrone was sulfonated using the same procedure that described in Example 1A.

Step 2B: Precipitation of indanthrone tetrasulfoacid. Indanthrone tetrasulfoacid was precipitated from a sulfuric-acid mother liquor after the separation of the trisulfoacid. The mother liquor was neutralized with ammonia and purified from inorganic salts by ultrafiltration. The process yielded an aqueous solution of indanthrone tetrasulfoacid ammonium salt containing 25 g of tetrasulfoderivative.

The indanthrone tetrasulfoacid was produced from the ammonium salt by an ion exchange in the course of which 500 ml of 1% ammonium salt solution passed through 100 g of ion-exchange resin. The produced solution was con centrated under vacuum and dried. The process yielded 4.7 g of indanthrone tetrasulfoacid of a structure:

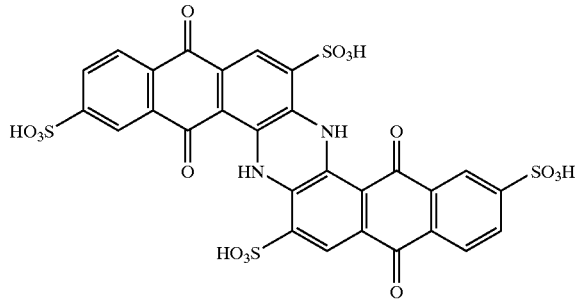

The electron spectrum (spectrometer Ocean PC 2000, aqueous solution) of the sample had $\lambda_{max}=760$ nm. The infrared spectrum (IR-Fourier spectrometer FSM-1201, film on the windows KRS-5) peaks were located at 11036.0, 1188.4 ($SO_3H$); 1643.7 (C=O). The mass-spectrum (VISION 2000) result was the following: molecular ion (negative polarity) of 760.88 (m/z), and calculated molecular weight value of 761.92. Elemental analysis measured (%) C 43.59; 43.83; H 1.67; 1.68; N 3.39; 3.31; S 16.78; 16.42. $C_{28}H_{14}N_2O_{16}S_4$. Calculated values were (%): C 44.09; H 1.85; N 3.67; S 16.18.

Example 3

Trisulfochloroindanthrone was synthesized by chlorination of trisulfoindanthrone. 4 ml of 50% nitric acid were introduced to a trisulfoindanthrone solution containing 13.6 g in 200 ml of 92% sulfuric acid. The solution was stirred to the complete oxidation of trisulfoindanthrone—until the solution acquired yellow color. Dry HCl was passed through the resultant solution at 50° C. for 12 hours. The reaction mixture was diluted with 300 ml of water, the precipitate was filtered and then boiled in 1 liter of water for 3 hours. After neutralization and ultrafiltration the process yielded an aqueous solution of trisulfoindanthrone containing 13 g of trisulfochloroindanthrone ammonium salt with the formula:

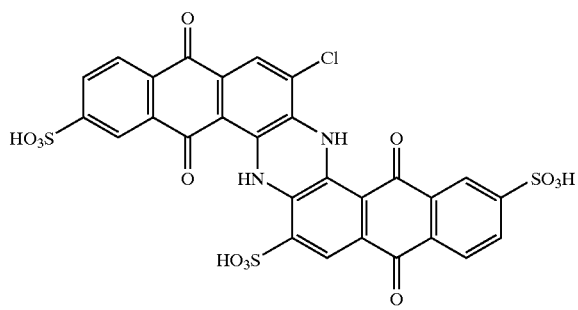

The electron spectrum (spectrometer Ocean PC 2000, aqueous solution) of the sample had $\lambda_{max}=680$ nm. Infrared spectrum (IR-spectrum, IR-Fourier spectrometer FSM-1201, film on the windows KRS-5) peaks were located at 1034.0, 1182.4 ($SO_3H$), and 1647.5 $cm^{-1}$ (C=O). The mass-spectrum (VISION 2000) measured molecular ion (negative polarity) was at 714,2 (m/z), and the calculated molecular weight was value of 715.93. Elemental analysis measured (%) C 46.71; 46.83; H 1.81; 1.68; Cl 4.54; 4.47; N 3.11; 3.34; S 13.93; 14.10. $C_{28}H_{13}Cl_1N_2O_{13}S_3$. Calculated values were C, 46.9; H 1.83; Cl 4.94; N 3.91; S 13.42

Tri- and tetraderivatives of indanthrone with other substituents were synthesized under similar conditions from the corresponding indanthrone derivatives, or through introducing a substituent to the oxidized form of sulfonated indanthrone.

Example 4

Dihydroxyindanthrone tetrasulfoacid was obtained by the sulfonation of dihydroxyindanthrone and the further precipitation as follows.

Step 4A. Sulfonation. 50 g of dihydroxyindanthrone (8,17-dihydroxy-6,15-dihydro-5,9,14,18-anthrazinetetrone) was introduced to a mixture of 100 ml of 10% oleum and 30 ml of the chlorosulfonic acid. The mixture was heated to 90–100° C. The reaction mixture was maintained at this temperature for 15 hours. The process yielded a tetrasulfonic derivative of dihydroxyindanthrone.

Step 4B. Precipitation of dihydroxyindanthrone tetrasulfoacid. The reaction mixture was cooled, two-fold diluted with 92% sulfuric acid, and then diluted with water to the rated sulfuric acid concentration 80%. The formed precipitate was filtered, diluted with 2 liters of water, and then boiled for 6 hours. Then the mixture was cooled. After neutralization with ammonia and ultrafiltration, the process yielded an aqueous solution of dihydroxyindanthrone tetrasulfoacid ammonium salt, containing 48 g of the desired product. The ammonium salt solution can be further used for liquid crystal system preparation.

Indanthrone dihydroxytetrasulfoacid was produced from the ammonium salt by ion exchange by passing 500 ml of a 1% ammonium salt solution through 100 g of ion-exchange resin. The obtained solution was concentrated in vacuum and dried. The process yielded indanthrone dihydroxytetrasulfoacid, containing 4.1 g of a desired product. The structure of indanthrone dihydroxytetrasulfoacid was as follows:

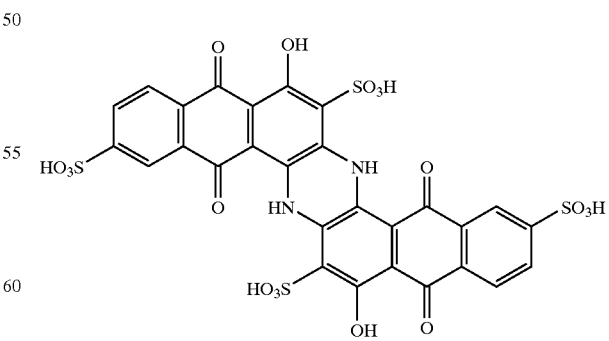

The electron spectrum (spectrometer Ocean PC 2000, aqueous solution) of the sample had $\lambda_{max}=480$ nm and 650 nm.

Infrared spectrum (IR-Fourier spectrometer FSM-1201, film on the windows KRS-5) peaks were located at 1036, 1188.4 ($SO_3H$); 1643.7 $cm^{-1}$ (C=O). The mass-spectrum (VISION 2000) result was the following: molecular ion (negative polarity) of 793.3 (m/z), and calculated molecular weight value of 794.68. Elemental analysis measured (%) C C 42.17, 42.28; H 1.79, 1.57; N 3.77, 3.92; S 16.26, 16.30, for $C_{28}H_{14}N_2O_{13}S_4$. Calculated values were (%):C 42.32; H 1.78; N 3.53; O 36.24; S 16.14.

Example 5

Diaminoindanthrone tetrasulfoacid was obtained by the sulfonation of diaminoindanthrone and the further precipitation as follows.

Step 5A. Sulfonation. 8,17-diamino-6,15-dihydro-5,9,14,18-anthrazinetetrone was sulfonated using the same procedure that described in Example 4A.

Step 5B. Precipitation. The precipitation was performed using the same procedure that described in Example 4B.

The process yielded a diaminoindanthrone tetrasulfoacid of a structure:

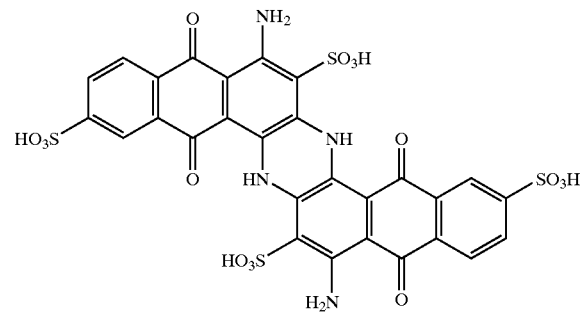

The electron spectrum (spectrometer Ocean PC 2000, aqueous solution) of the sample had $\lambda_{max}$=495 nm and 650 nm. The mass-spectrum (VISION 2000) result was the following: molecular ion (negative polarity) of 790.9 (m/z), and calculated molecular weight value of 792.71.

Example 6

Synthesis of Hydroxyindanthrone Trisulfoacid.

The mixture of 8 g of tetrasulfoindanthrone and 150 ml of sulfuric acid was heated to 150° C. The mixture was further maintained at this temperature for 2 hours. The reaction mixture was then diluted with water to the rated sulfuric acid concentration 70%. The precipitate was isolated by filtration and then diluted with 1000 ml of water. The solution was then boiled for 1 hour. After neutralization with ammonia and ultrafiltration, the process yielded an aqueous solution of dihydroxyindanthrone tetrasulfoacid ammonium salt, containing 6.5 g of the desired product. The ammonium salt solution can be further used for liquid crystal system preparation.

Hydroxyindanthrone trisulfoacid was produced from the ammonium salt by ion exchange. The obtained solution was concentrated in vacuum and dried. The process yielded hydroxyindanthrone trisulfoacid, containing 4.1 g of a desired product of a following structure:

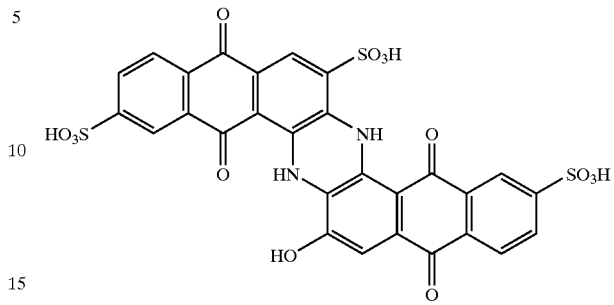

The electron spectrum (spectrometer Ocean PC 2000, aqueous solution) of the sample had $\lambda_{max}$=485 nm and 670 nm. The mass-spectrum (VISION 2000) result was the following: molecular ion (negative polarity) of 697.3 (m/z), and calculated molecular weight value of 698.6.

Example 7

Synthesis of Methoxyindanthrone Trisulfoacid.

6 g of dimethylsulfate was introduced to a mixture of 3.4 g of hydroxyindanthrone trisulfoacid and 50 ml of water. The mixture was heated to 40° C. A 10% aqueous solution of sodium hydroxide was gradually (over one hour) introduced to the reaction mixture dropwise so as to maintain pH 8.3–8.6. After ultrafiltration the process yielded an aqueous solution of trisodium salt of methoxyindanthrone trisulfoacid. This salt solution can be further directly used for liquid crystal system preparation.

Methoxyindanthrone trisulfoacid was obtained from the trisodium salt by ion exchange by passing 300 ml of 1% ammonium salt solution through 100 g of an exchange resin. The solution was further concentrated in vacuum and dried. The process yielded 2.6 g of methoxyindanthrone trisulfoacid of a structure:

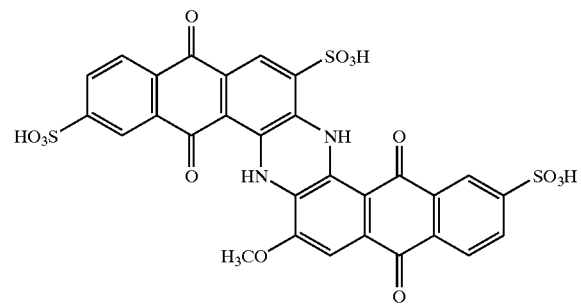

The electron spectrum (spectrometer Ocean PC 2000, aqueous solution) of the sample had $\lambda_{max}$=695 nm. The mass-spectrum (VISION 2000) result was the following: molecular ion (negative polarity) of 711.3 (m/z), and calculated molecular weight value of 712.64.

Example 8

Synthesis of Bromoindanthrone Trisulfoacid.

5 ml of a 10% aqueous solution of sodium nitrite was gradually introduced to a solution of 3.4 g of indanthrone trisulfoacid in 120 ml of sulfuric acid. The introduction was performed dropwise for 30 minutes so as to maintain the mixture at the temperature of 40–45° C. The mixture was further stirred for 1 hour. The 7 ml of a 10% aqueous solution of sodium bromide was slowly (dropwise) introduced to the resulting mixture of yellow color. The mixture further was stirred for 10 hours at a temperature of 40–45° C. Then the reaction mixture was diluted with water to a final sulfuric acid concentration of 60%. The precipitate of bromoindanthrone trisulfoacid was isolated by filtration and dissolved in water. After neutralization with ammonia and ultrafiltration, the process yielded an aqueous solution of bromoindanthrone trisulfoacid ammonium salt.

Bromoidanthrone trisulfoacid was produced from the ammonium salt by ion exchange. The obtained solution was concentrated in vacuum and dried. The process yielded bromoidanthrone trisulfoacid of a following structure:

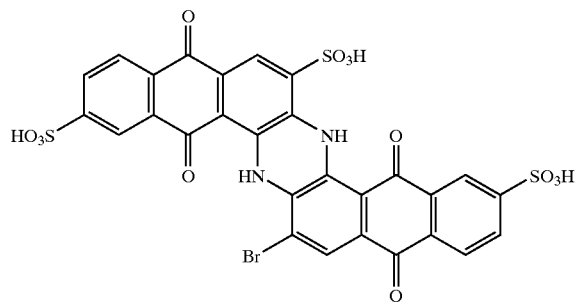

The electron spectrum (spectrometer Ocean PC 2000, aqueous solution) of the sample had $\lambda_{max}$=680 nm. The mass-spectrum (VISION 2000) result was the following: molecular ion (negative polarity) of 761.2 (m/z), and calculated molecular weight value of 761.51.

Example 9

Compositions and films based on individual trisulfochloroindanthrones were produced according to the present invention and analyzed to determine the film's optical characteristics. 12 g of trisulfochloroindanthrone (R=NH$_4$, X=Cl, n=3) were introduced with stirring at a temperature 20° C. into 78.0 g of deionized water. Then, 0.1 g of sulfonol solution in 10 g of water was added to the resultant mixture, and the mixture was thoroughly stirred. The yield was 100 g of 12% LC solution. The produced solution was coated on a glass plate surface with a Meyer rod No 3 at a linear rate 25 mm s$^{-1}$ at a temperature of 20° C. and relative humidity of 65%. The film was dried at the same temperature and humidity.

To determine the optical characteristics of the film, sample transmittance spectra were measured using an Ocean PC 2000 spectrophotometer in polarized light in the wavelength range of approximately 400 to 800 nm with the incident beam polarization plane oriented both parallel ($T_{par}$) and perpendicular ($T_{per}$) to the solution deposition direction. The contrast ratio CR=$T_{par}$/2$T_{per}$ for the absorption maximum wavelength at $\lambda$=650 nm was equal to 95 at transmittance T=40.0%.

Example 10

Compositions and films based on indanthrone sulfoderivative mixture were produced according to the present invention and analyzed to determine the film's optical characteristics.

12 g of dye mixture containing 10% of tetrasulfoindanthrone, 35% of trisulfoindanthrone, 25% of disulfoindanthrone, 12% of trisulfochloroindanthrone, 8% of disulfochloroindanthrone and 10% of monosulfoindanthrone was introduced with stirring at a temperature 20° C. into 78.0 g of deionized water. Then, 0.1 g of sulfonol solution diluted in 10 g of water was added to the resultant mixture, and the mixture was thoroughly stirred. The yield was 100 g of 12% LC solution. The produced solution was coated on a glass plate surface with a Meyer rod No. 3 at a linear rate 25 mm s$^{-1}$ at a temperature of 20° C. and relative humidity of 65%. The film was dried at the same temperature and humidity.

To determine optical characteristics of the film, sample transmittance spectra were measured using an Ocean PC 2000 spectrophotometer in polarized light in the wavelength range of approximately 400 to 800 nm with the incident beam polarization plane oriented both parallel ($T_{par}$) and perpendicular ($T_{per}$) to the solution deposition direction. The contrast ratio CR=$T_{par}$/2$T_{per}$ for the absorption maximum wavelength at $\lambda$=650 nm was equal to 98 at transmittance T=39.8%.

Example 11

A composition and film from the mixture of indanthrone sulfoderivatives with perylenetetracarboxylic acid dibenzimidazole disulfoderivative were produced according to the present invention and analyzed to determine the film's optical characteristics.

A 12 g dye mixture containing 5% of tetrasulfoindanthrone, 17.5% of trisulfoindanthrone, 12.5% of disulfoindanthrone, 6% of trisulfochloroindanthrone, 4% of disulfochloroindanthrone, 5% of monosulfoindanthrone and 50% of perylenetetracarboxylic acid dibenzimidazole disulfoderivative was dissolved with stirring at 20° C. in deionized water (78.0 g). Then, the sulfonol solution (0.1 g in 10 g of water) was introduced and the formed mixture was thoroughly stirred. The yield was 100 g of 12% LC solution. The solution was coated on a glass plate surface with a Meyer rod No 3 at a linear rate 25 mm s$_{-1}$ at a temperature of 20° C. and relative humidity of 65%. The film was dried at the same temperature and humidity.

To determine optical characteristics of the film, sample transmittance spectra were measured using an Ocean PC 2000 spectrophotometer in polarized light in the wavelength range of approximately 400 to 800 nm with the incident beam polarization plane oriented both parallel ($T_{par}$) and perpendicular ($T_{per}$) to the solution deposition direction. The contrast ratio CR=$T_{par}$/2$T_{per}$ for the absorption maximum wavelength at $\lambda$=595 nm was equal to 98 at transmittance T=41.5%.

Example 12

A composition and film from a mixture of indanthrone sulfoderivatives were produced according to the present invention and analyzed to determine the film's optical characteristics.

A 12 g dye mixture, containing 10% of tetrasulfodihydroxyindanthrone, 35% of trisulfohydroxyindanthrone, 25% of disulfoindanthrone, 12% of trisulfobromoindanthrone, 8% of disulfochloroindanthrone and 10% of trisulfomethoxyindanthrone %, was dissolved by stirring at 20° C. in 78g of deionized water. Then, the sulfonol solution (0.1 g of sulfonol in 10 g of water) was introduced and the formed mixture was thoroughly stirred. The yield was 100 g of 12% liquid crystal solution. The solution was coated on a glass plate surface with a Meyer rod No. 3 at a linear rate 25 mm $s^{-1}$ at a temperature of 20° C. and relative humidity of 65%. The film was dried at the same temperature and humidity.

To determine optical characteristics of the film, sample transmittance spectra were measured using an Ocean PC 2000 spectrophotometer in polarized light in the wavelength range of approximately 400 to 800 nm with the incident beam polarization plane oriented both parallel ($T_{par}$) and perpendicular ($T_{per}$) to the solution deposition direction. The contrast ratio $CR=T_{par}/2T_{per}$ for the absorption maximum wavelength at $\lambda=630$ nm was equal to 72 at transmittance T=37.0%.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. An indanthrone sulfoderivative characterized by a structural formula selected from the group consisting of structures I and II:

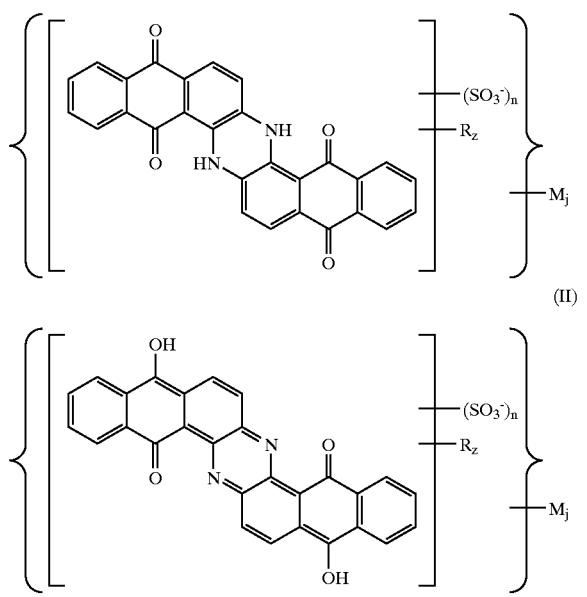

wherein:

n is an integer equal to 3 or 4;
R is individually selected from the group consisting of CH$_3$, C$_2$H$_5$, OCH$_3$, OC$_2$H$_5$, Cl, Br, OH, NH$_2$;
z is an integer in the range of 0 to 4;
M is a counterion; and
j is the number of counterions in a dye molecule.

2. The indanthrone sulfoderivative of claim 1, wherein said derivative is capable of forming a lyotropic liquid crystal phase.

3. The indanthrone sulfoderivative of claim 1, wherein said derivative is capable of forming optically anisotropic films.

4. The indanthrone sulfoderivative of claim 1, wherein said derivative is capable of forming optically isotropic films.

5. The indanthrone sulfoderivative of claim 1, wherein said derivative is capable of forming at least partially crystalline films.

6. The indanthrone sulfoderivative of claim 3, wherein said derivative is capable of forming polarizing films.

7. The indanthrone sulfoderivative of claim 3, wherein said derivative is capable of forming double-refraction films.

8. The indanthrone sulfoderivative of claim 3, wherein said derivative is capable of forming phase-retarding films.

9. A lyotropic liquid crystal system comprising at least one indanthrone sulfoderivative characterized by a structural formula selected from the group consisting of structures I and II:

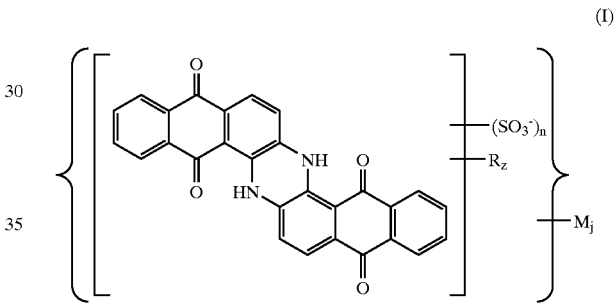

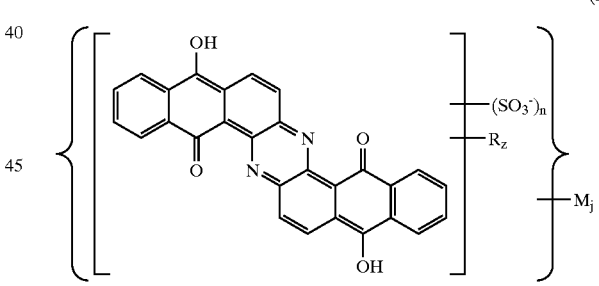

wherein:

n is an integer equal to 3 or 4;
R is individually selected from the group consisting of CH$_3$, C$_2$H$_5$, OCH$_3$, OC$_2$H$_5$, Cl, Br, OH, NH$_2$;
z is an integer in the range of 0 to 4;
M is a counterion; and
j is the number of counterions in a dye molecule.

10. The lyotropic liquid crystal system of claim 9, wherein said lyotropic liquid crystal system further comprises water.

11. The lyotropic liquid crystal system of claim 9, wherein said lyotropic liquid crystal system further comprises a mixture of water and an organic solvent, said organic solvent being miscible with water.

12. The lyotropic liquid crystal system of claim 9, wherein the content of indanthrone sulfoderivatives is in the range of approximately from 3% to 40% by mass.

13. The lyotropic liquid crystal system of claim 12, wherein the content of indanthrone sulfoderivatives is in the range of approximately 5% to 25% by mass.

14. The lyotropic liquid crystal system of claim 9 further comprising up to approximately 5% by mass of surfactants.

15. The lyotropic liquid crystal system of claim 9 further comprising up to approximately 5% by mass of plasticizers.

16. The lyotropic liquid crystal system of claim 9, further comprising at least one compound representing indanthrone sulfoderivative of the general structural formula:

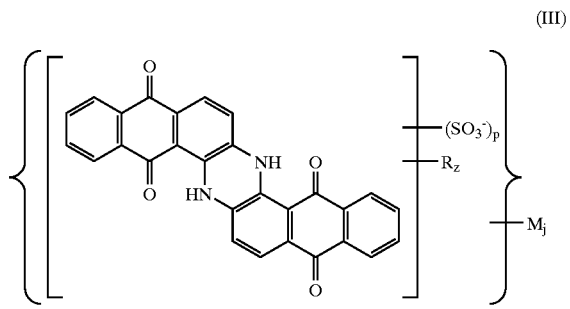

(III)

wherein:
  p is an integer equal to 1 or 2;
  R is individually selected from the group consisting of $CH_3$, $C_2H_5$, $OCH_3$, $OC_2H_5$, Cl, Br, OH, $NH_2$;
  z is an integer in the range of 0 to 4;
  M is a counterion; and
  j is the number of counterions in a dye molecule.

17. The lyotropic liquid crystal system of claim 16, further comprising:
  indanthrone tetrasulfoderivatives of structures I and II in a concentration range of approximately 0% to 20% by mass;
  indanthrone trisulfoderivatives of structures I and II in a concentration range of approximately 0% to 70% by mass;
  indanthrone disulfoderivatives of a structure III in a concentration range of approximately 0% to 70% by mass; and
  indanthrone monosulfoderivatives of a structure III in a concentration range of approximately 0% to 30% by mass.

18. The lyotropic liquid crystal system of claim 17, further comprising:
  indanthrone tetrasulfoderivatives of structures I and II in a concentration range of approximately 0% to 20% by mass;
  indanthrone trisulfoderivatives of structures I and II in a concentration range of approximately 10% to 60% by mass;
  indanthrone disulfoderivatives of a structure III in a concentration range of approximately 10% to 60% by mass; and
  indanthrone monosulfoderivatives of a structure III in a concentration range of approximately 0% to 20% by mass.

19. The lyotropic liquid crystal system of claim 9, further comprising:
  at least one water-soluble organic dye capable of forming a common lyotropic liquid crystal system with at least one indanthrone sulfoderivative of structure I and/or II.

20. The lyotropic liquid crystal system of claim 9, further comprising at least two compounds individually selected from structures I and II.

21. The lyotropic liquid crystal system of claim 9, further comprising at least two compounds individually selected from structures I and II with at least two different substituents R and/or M and/or different n and/or z values.

22. An optically anisotropic film comprising:
  at least one indanthrone sulfoderivative selected from the group consisting of structures I and II:

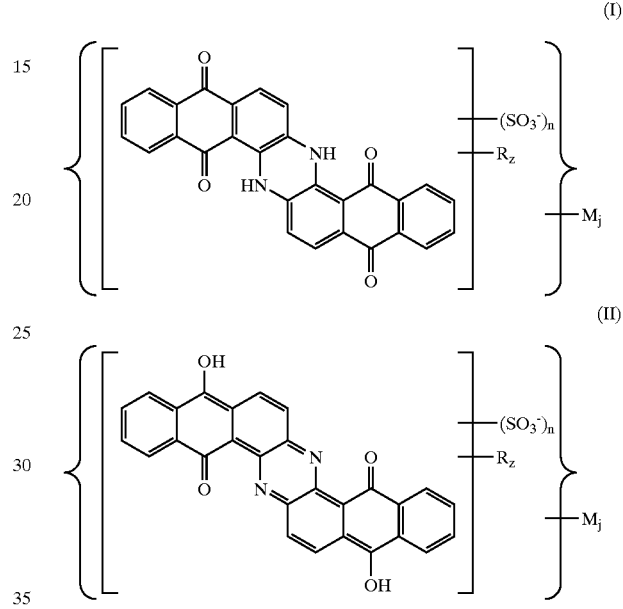

wherein:
  n is an integer equal to 3 or 4;
  R is individually selected from the group consisting of $CH_3$, $C_2H_5$, $OCH_3$, $OC_2H_5$, Cl, Br, OH, $NH_2$;
  z is an integer in the range of 0 to 4;
  M is a counterion; and
  j is the number of counterions in a dye molecule.

23. The optically anisotropic film of claim 22, wherein said film is at least partially crystalline.

24. The optically anisotropic film of claim 23 wherein the interplanar spacing in a crystal is in the range of approximately 3.1 Å to 3.7 Å along one of the optical axes.

25. The optically anisotropic film of claim 22, further comprising at least one indanthrone sulfoderivative of structural formula III:

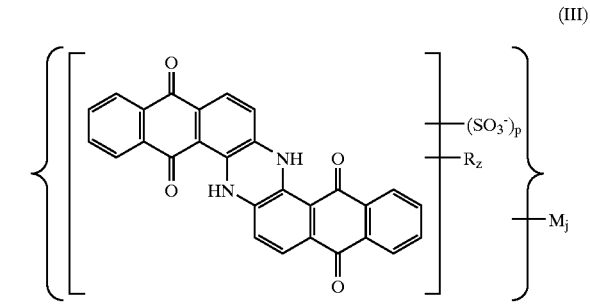

(III)

wherein:

p is an integer equal to 1 or 2;

R is individually selected from the group consisting of CH$_3$, C$_2$H$_5$, OCH$_3$, OC$_2$H$_5$, Cl, Br, OH, NH$_2$;

z is an integer in the range of 0 to 4;

M is a counterion; and j is the number of counterions in a dye molecule.

26. The optically anisotropic film of claim 25, comprising:

indanthrone tetrasulfoderivatives of structures I and II in a concentration range of approximately 0% to 20% by mass;

indanthrone trisulfoderivatives of structures I and II in a concentration range of approximately 0% to 70% by mass;

indanthrone disulfoderivatives of a structure III in a concentration range of approximately 0% to 70% by mass; and indanthrone monosulfoderivatives of a structure III in a concentration range of approximately 0% to 30% by mass.

27. The optically anisotropic film of claim 26, comprising:

indanthrone tetrasulfoderivatives of structures I and II in a concentration range of approximately 0% to 20% by mass;

indanthrone trisulfoderivatives of structures I and II in a concentration range of approximately 10% to 60% by mass;

indanthrone disulfoderivatives of a structure III in a concentration range of approximately 10% to 60% by mass; and indanthrone monosulfoderivatives of a structure III in a concentration range of approximately 0% to 20% by mass.

28. The optically anisotropic film of claim 22, further comprising at least one water-soluble organic dye.

29. The optically anisotropic film of claim 22, comprising at least two compounds of structures I and II.

30. The optically anisotropic film of claim 22, comprising at least two compounds of at least one of the structures I and II with at least two different substituents R and/or M and/or different n and/or z values.

31. The anisotropic film of claim 22, wherein said film is polarizing.

32. The anisotropic film of claim 22, wherein said film is a retarder.

33. A method of making an optically anisotropic film, comprising the steps of:

depositing a lyotropic liquid crystal system according to claim 8 onto a substrate;

applying an orienting force; and drying.

34. The method of making an optically anisotropic film of claim 33, wherein the lyotropic liquid crystal system further comprising at least one compound representing indanthrone sulfoderivative of the general structural formula:

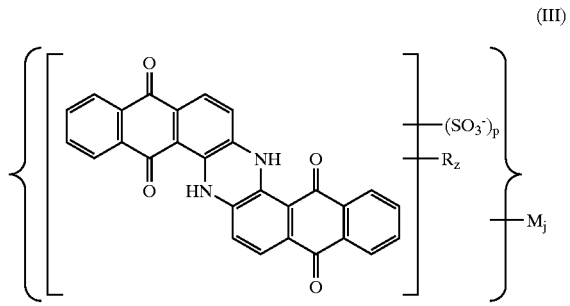

(III)

wherein:

p is an integer equal to 1 or 2;

R is individually selected from the group consisting of CH$_3$, C$_2$H$_5$, OCH$_3$, OC$_2$H$_5$, Cl, Br, OH, NH$_2$;

z is an integer in the range of 0 to 4;

M is a counterion; and j is the number of counterions in a dye molecule.

* * * * *